United States Patent [19]

Cramer

[11] 4,195,817

[45] Apr. 1, 1980

[54] OXYGEN REGULATOR

[75] Inventor: Robert L. Cramer, Davenport, Iowa

[73] Assignee: The Bendix Corporation, Southfield, Mich.

[21] Appl. No.: 928,673

[22] Filed: Jul. 28, 1978

Related U.S. Application Data

[62] Division of Ser. No. 812,547, Jul. 5, 1977, Pat. No. 4,127,129.

[51] Int. Cl.[2] .......... F16K 1/14

[52] U.S. Cl. .......... 251/340; 137/508; 251/343

[58] Field of Search .......... 137/508; 251/340, 343, 251/354

[56] References Cited

U.S. PATENT DOCUMENTS 2,219,408 10/1940 Benz .......... 137/508 X 2,726,678 12/1955 Eyerly .......... 137/508

FOREIGN PATENT DOCUMENTS 42-23094 12/1967 Japan .......... 251/340

*Primary Examiner*—Robert G. Nilson

*Attorney, Agent, or Firm*—Leo H. McCormick, Jr.; Ken C. Decker

[57] ABSTRACT

An oxygen regulator for supplying a recipient with breathable fluid in response to an inhalation demand. A diaphragm which is responsive to the inhalation demand operates a balanced oxygen valve to allow pressurized oxygen flow into a mixing chamber. The flow of pressurized oxygen into the mixing chamber draws air into the mixing chamber through an altitude responsive valve. The pressurized oxygen and air are combined in the mixing chamber to create a volume of breathable fluid sufficient to meet the inhalation demand of the recipient.

4 Claims, 4 Drawing Figures

OXYGEN REGULATOR

This is a division of application Ser. No. 812,547, filed July 5, 1977, now U.S. Pat. No. 4,127,129.

BACKGROUND OF THE INVENTION

This invention relates to an oxygen regulator for supplying an aviator with a breathable fluid in response to an inhalation demand. At altitudes above 40,000 feet ambient atmospheric pressure becomes so low that aviators can suffer harmful effects such as black-outs. Therefore, it is essential that at least a minimum amount of oxygen supplements the breathable air supplied to the aviator. To add such oxygen to the air supply system is common practice to include a demand regulator between a source of oxygen and the aviator breathing mask. Most demand oxygen regulators include an aneroid responsive valve which proportions the amount of oxygen and air supplied to the mixing chamber for distribution to the recipient. In such oxygen regulators, of which U.S. Pat. No. 3,496,954 is typical, a fixed proportion of ambient air and oxygen are supplied to a recipient below a predetermined elevation and when the aircraft goes above the predetermined elevation, the amount of air is proportionally reduced and the amount of oxygen is proportionally increased. Above 40,000 feet it is normal procedure that oxygen alone be supplied to the aviator. Unfortunately with fixed proportioning the breathable air does not meet every aviator's inhalation demand.

SUMMARY OF THE INVENTION

I have devised an oxygen regulator for use by an aviator in an aircraft having a balanced operational main valve which follows the inhalation/exhalation breathing cycle of the aviator to satisfy inhalation demands irrespective of altitude. The oxygen regulator has a housing with an inlet port through which a supply of oxygen is connected to the balanced operational main valve, to a control valve and to an altitude responsive switching apparatus through an orifice. In a normal operation the switch allows oxygen to be communicated to a second valve where the oxygen pressure moves an air inlet valve away from a seat and allows air to enter into a supply chamber adjacent a mixing chamber. An aneroid device is located in the second chamber adjacent the inlet port into the mixing chamber. As the aircraft changes altitude, the altitude responsive apparatus correspondingly changes the flow path between the supply chamber and the mixing chamber to proportion the amount of air allowed to flow into the mixing chamber. When an inhalation demand is communicated to an outlet port in the mixing chamber, a breathing diaphragm moves away from the main valve and allows oxygen to flow into the mixing chamber through an injector orifice associated with a first valve. The inhalation demand opens an air check valve in the second valve to allow communication between the atmosphere and the mixing chamber. As oxygen enters the mixing chamber through the injector, jet flow occurs and causes a suction to be created in the mixing chamber. This suction draws air through the second valve into the mixing chamber as a function of altitude. At altitudes below 20,000 feet, the flow of air is controlled by the action of a check valve in the second valve. As the aircraft increases in altitude above 20,000 feet, an aneroid expands to proportionally reduce the size of an air port in the second valve and at about 30,000 feet the air port is completely closed off. Thereafter, 100% oxygen is delivered to the mixing chamber.

As the aircraft increases in altitude, oxygen from the supply conduit is communicated to the backside of the breathing diaphragm through a restrictive passage in an altitude responsive sensor to modify the effect of the inhalation demand by providing a positive pressure on the backside of the diaphragm and aid in opening the balanced valve during inhalation demands by the recipient.

During periods when an operator desires that only oxygen should be supplied to the mixing chamber, a manual control switch is moved to a position whereby the communication of oxygen to the backside of the second valve is dumped to atmosphere. When this happens, the air control valve remains in the closed position and the inhalation demand by the recipient is completely controlled by the inhalation force applied across the breathing diaphragm.

In another mode of operation where the pressurized oxygen is desired, the selector switch is manually moved to a position whereby the breathing diaphragm is spring loaded in an open position. In this position oxygen under pressure is allowed unrestricted flow through the first valve, around the seat and into the mixing chamber. This only occurs when an emergency oxygen pressure is needed to provide positive breathing pressure assist for the recipient.

The supply line through which the breathable fluid is communicated from the oxygen regulator to the mask attached to the recipient is usually a flexible corregated conduit. During certain operations of the aircraft, the recipient is required to move his head and body to various positions. Such movement can create a fluid pressure in the flexible conduit. In order to reduce the effect of such fluid pressure, a relief valve is connected to the mixing chamber of the oxygen regulator which dumps or relieves the flexible conduit of such movement created fluid pressure in order that the operation of the oxygen regulator remains responsive to the inhalation-/exhalation breathing cycle of the recipient.

In addition, an anti-suffocation valve is connected to the mixing chamber. The anti-suffocation allows air from the surrounding environment to enter the mixing chamber whenever the flow of oxygen through the first valve and/or air through the second valve is insufficient to meet an inhalation demand within a prescribed time period.

It is the object of this invention to provide an oxygen regulator with a balanced valve which is responsive to a breathing inhalation pressure signal to allow pressurized oxygen to enter into a mixing chamber and be combined with air flowing therein through an air inlet valve in response to a pressure condition created by the flow of oxygen into the mixing chamber.

It is another object of this invention to provide a balanced valve for use in an oxygen regulator having a sleeve member which surrounds an inlet tube. The sleeve is connected to an actuator which is moved in response to an inhalation demand of a recipient. As the sleeve moves, oxygen flows into a mixing chamber and fulfills an inhalation demand of the recipient.

It is another object of this invention to provide an oxygen regulator with a first valve member and a second valve member for simultaneously controlling the proportion of oxygen and air which are supplied to a mixing chamber as a function altitude to meet an inhalation demand of an aviator.

It is another object of this invention to provide an oxygen regulator having a first valve which controls the flow of oxygen into a mixing chamber and a second valve which controls the flow of air into a mixing chamber with a sensing device responsive to altitude to allow a breathing fluid to be created in the mixing chamber which is sufficient to meet the physiological demands of the recipient.

These and other objects of the invention will become apparent from a reading of the specification and viewing the drawings.

DETAILED DESCRIPTION OF THE PREFERRED EMBODIMENT

Figure 1:
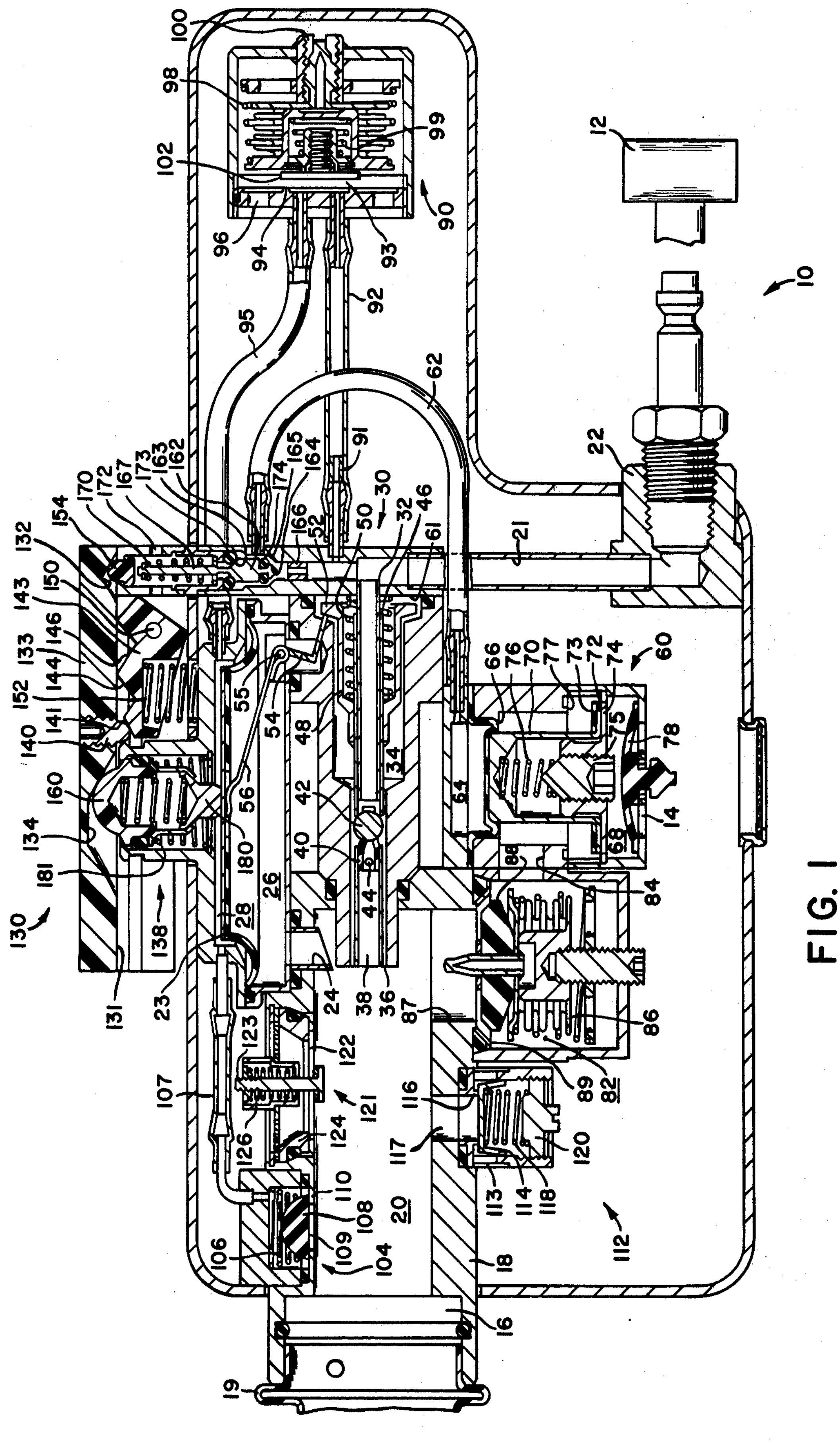
FIG. 1 is a sectional view of an oxygen regulator made according to the principles of my invention with an actuation switch in a first mode of operation.

The oxygen regulator 10 shown in FIG. 1 is designed to be utilized in an aircraft breathing system which supplies breathable fluid to an aviator in response to an inhalation/exhalation cycle to meet the physiological demands experienced with changes in altitude.

The oxygen regulator apparatus 10 includes a housing 18 which has a mixing chamber 20 located therein. The mixing chamber 20 is connected to a breathing mask (not shown) in the aircraft breathing system by attaching conduit 19 to outlet port 16. The mixing chamber 20 is connected to a source of oxygen 12 through a first inlet port 22 and to the atmosphere through a second inlet port 14. The mixing chamber 20 is connected to an inhalation responsive chamber 26 by a passage 24. A breathing diaphragm 23 separates the inhalation responsive chamber 26 from a control chamber 28.

A balanced valve member 30 is located between the first inlet port 22 and the interior of the mixing chamber 20 to control the flow of oxygen from conduit 21. The balanced valve member 30 includes a tube 32 which extends into an oxygen supply chamber 34. A passage 36 connects the oxygen supply chamber 34 with the mixing chamber 20 and a cylindrical member 38 which substantially fills the passage 36. The cylindrical member 38 has a stem 40 which plugs the end thereof and extends through a ball or spherical member 42. A pin 44 which extends through the cylindrical member 38 and is fastened to the housing 18 to fix the position of the ball or spherical member 42 with respect to the oxygen supply chamber 34. A sleeve 46 which surrounds the tube 32 is urged into engagement with the ball or spherical member 42 by spring 50 to prevent communication through tube 32 between the supply of oxygen in the supply conduit 21 and the oxygen supply chamber 34. A concentric spring guide 48 which surrounds sleeve 46 has a projection 52 which engages leg 54 of lever arm 56 mounted on pivot pin 55 in the inhalation control chamber 26. The lever arm 56 engages the center of the diaphragm 28 and is correspondingly moved thereby to allow oxygen to flow from tube 32 into the oxygen supply chamber 34 in response to movement of diaphragm 28 by an inhalation demand.

The oxygen supply conduit 21 is also connected to a switch over valve 136. The switch over valve 136 includes a plunger 162 which has a face 164 adjacent restriction 166 in the oxygen supply line 21. The plunger 162 has a stem 167 which extends to a position adjacent knob 154 associated with selector 133 of the operational switch 130. A spring 170 which is attached to stem 167 holds face 165 on plunger 162 against seal 173 to prevent pressurized oxygen from being communicated to an exhaust port 172 and allow pressurized oxygen to flow through conduit 62 to a pressure chamber 64 in an on-off inlet valve 60 which controls the communication of air into the mixing chamber 20.

The pressure chamber 64 of the on-off inlet valve 60 is separated from an air inlet chamber 68 by a diaphragm 66. A plunger 70 attached to the diaphragm 66 has a radial projection 72 on the end thereof which is adapted to engage a retainer 74 to limit the movement of the diaphragm toward the air inlet chamber 68. However, an adjustable screw 75 attached to the retainer 74 holds a spring 76 against plunger 70. In the absence of pressurized oxygen in pressure chamber 64, spring 76 urges resilient face 73 on plunger 70 against lip 77 to prevent the flow of air through the air inlet chamber 68 into the mixing chamber. Whereas, with pressurized oxygen in the pressure chamber 64, the flow of air into the inlet chamber 68 is solely controlled by flapper 78 which covers inlet port 14.

The air inlet chamber 68 is connected to the mixing chamber 20 through an air control chamber 82. A first passage 84 provides a flow path for air in the inlet chamber 68 into the air control chamber 82. A second passage 87 provides a flow path for air in the air control chamber 82 into the mixing chamber 20. The flow of air from the air control chamber 82 is controlled by an aneroid valve 86 located therein. The aneroid valve 86 has a face 88 positioned adjacent the seat 89 in passage 87 to the mixing chamber 20. The face 88 of the aneroid valve 86 changes position with respect to seat 89 with corresponding changes in altitude to vary the size of the flow path from the air inlet chamber 68 into the mixing chamber 20 and thereby restrict the flow of air into the mixing chamber 20.

The oxygen supply conduit 21 is also connected to a sensing member 90 by a conduit 92. The sensing member 90 has a housing with control chamber 93 which is connected to the control chamber 28 over the diaphragm 23 by conduit 95 and to the atmosphere through passages 96. The sensing member 90 includes an aneroid 98 which is movable by adjustment member 100 to a position such that face 102 is adjacent the control chamber 93. With changes in altitude the aneroid 98 moves the face 102 toward the control chamber 93 and at a fixed elevation interrupts the communication of oxygen from the control chamber 93 to the atmosphere. Thereafter, pressurized oxygen is directed to the control chamber 28 and acts on backside of the diaphragm 23 to provide a back pressure to reduce the force required to move lever 56 by an inhalation signal.

The mixing chamber 20 is also connected to the atmosphere through hose movement relief valve 104. The hose movement relief valve 104 has a poppet 108 which is urged against seat 110 by a spring 106. Certain activities of the recipient require considerable movement resulting in corresponding movement of the flexible conduit 19. As the flexible conduit moves, it is possible to compress the breathable fluid contained therein producing a pressure rise in the fluid in the mixing chamber 20. This rise in pressure in the mixing chamber acts on the face 109 of poppet 108 and overcomes spring 106 to allow a volume of fluid to flow around seat 110 and the atmosphere through conduit 107 connection to conduit 95.

The same back pressure communicated to control chamber 28 is also communicated to the backside of poppet 108 and aids the spring 100 in holding face 109 against seat 110. Thus, the force holding poppet 108 as disclosed is continually changing with corresponding changes in altitude and the operational pressure level in the mixing chamber is maintained within a predetermined range throughout the altitude operating range of the aircraft.

The mixing chamber 20 is also connected to the atmosphere through a pressure relief valve 112. The pressure relief valve 112 has a poppet 114 which is held against a seat 116 in port 117 by a spring 118. An adjustment screw 120 changes the tension on spring 118 in order to set a limit as to when pressure in the mixing chamber is communicated to the atmosphere by overcoming spring 118 and allowing communication to the atmosphere through ports 113.

In addition, the mixing chamber 20 is also connected to the atmosphere through an anti-suffocation valve 121. The anti-suffocation valve 121 has a face 122 which is held against a seat 124 by a spring 126. This anti-suffocation valve 121 includes an adjustable mechanism 123 similar to that disclosed in U.S. Pat. No. 4,018,243 and incorporated herein by reference, for controlling the inhalation signal required to allow air to enter into the mixing chamber 20.

The mode of operation of the oxygen regulator is controlled by a switch 130 which has three operational positions.

In the first operational position, as shown in FIG. 1, detents 132 and 134 on selector 133 are located over the switch over the valve 136 and the pressurized oxygen supply valve 138 while tip 140 engages groove 141 on rack 143 to hold the selector 133 in a fixed position. The rack 143 which is attached to the housing 18 by a pin 150 and is held against the tip 140 by a spring 152. In the first operational position, oxygen and air are proportioned to the recipient in response to inhalation/exhalation signals presented to the oxygen regulator 10.

Figure 2:
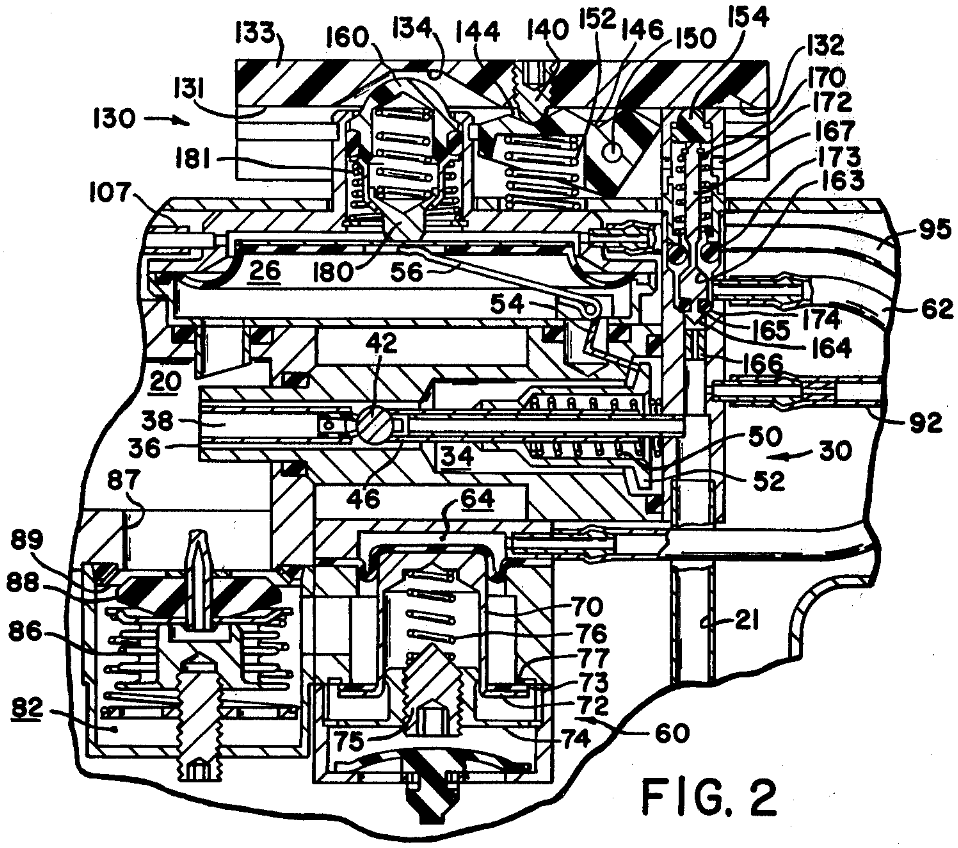
FIG. 2 is a sectional view of the actuation switch of the oxygen regulator of FIG. 1 in a second mode of operation.

When the selector 133 is moved from the first operational position as shown in FIG. 1 to the second operational position, as shown in FIG. 2, the switch over valve 136 is activated by the engagement of knob 154 with the interior surface 131 of the selector 133. Tip 140, when located in groove 144 of rack 143, holds selector 133 in this second operational position. Movement of stem 167 by knob 154 brings seal 174 on plunger 162 into engagement with seat 165 in conduit 21 to prevent communication of pressurized oxygen through the restriction 166 and open communication between conduit 62 and exhaust port 172 between face 165 and seal 173. With a fluid path between face 165 and seal 173, the pressurized oxygen in pressure chamber 64 is vented to the atmosphere through port 172. Thereafter, spring 76 urges resilient face 73 on plunger 70 against lip 77 to prevent communication of air into the air inlet chamber 84. Thereafter, only pressurized oxygen is supplied to the mixing chamber 20 to meet the physiological needs of the recipient corresponding to the inhalation/exhalation demand signal.

Figure 3:
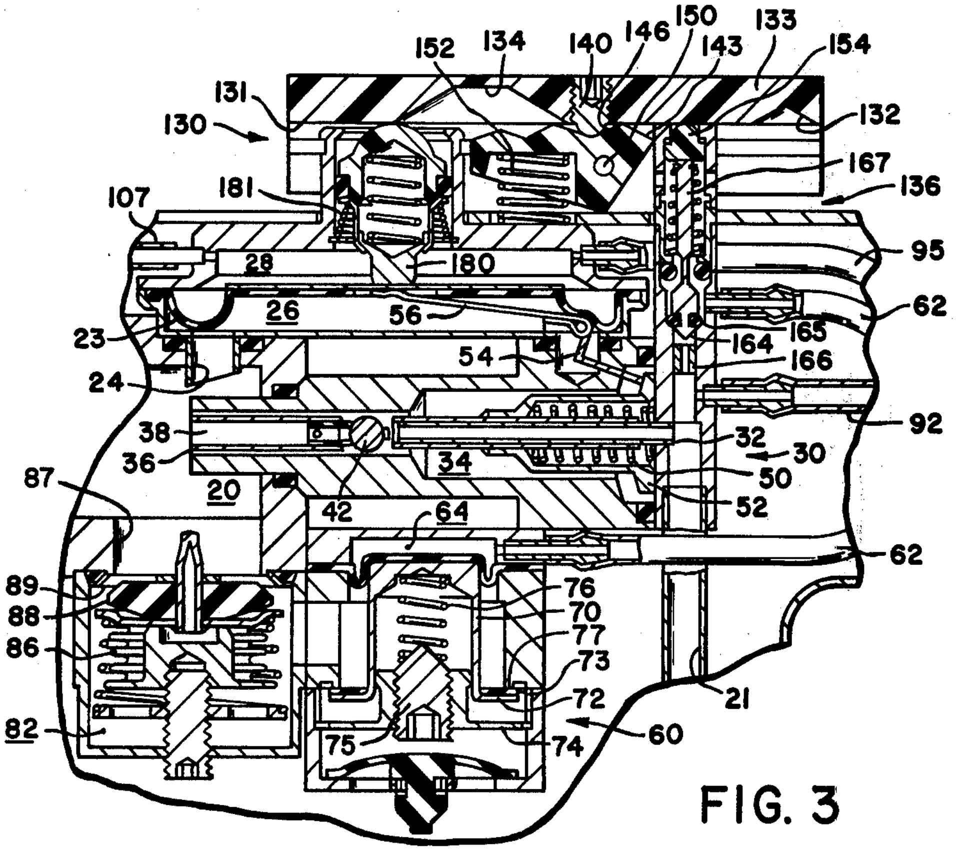
FIG. 3 is a sectional view of the oxygen regulator of FIG. 1 showing the operational switch in a third mode of operation whereby positive oxygen pressure is directly delivered to the mixing chamber.

When the selector 133 of switch 130 is moved to the third operational position, shown in FIG. 3, the pressurized oxygen supply valve 138 is activated through the engagement of knob 160 with the interior surface 131 of the selector 133. Tip 140 when located in groove 146 holds selector 133 in this third operational position.

The activated pressurized oxygen supply valve 138 has a plunger 180 which extends into the control chamber 28 as spring 181 is compressed. With spring 181 compressed, plunger 180 moves the diaphragm 23 toward the inhalation control chamber 26. As diaphragm 23 moves, lever arm 56 pivots on pin 55 causing linear movement of sleeve 46 on the tube 32. When sleeve 46 moves away from ball 42, pressurized oxygen in conduit 21 flows into the oxygen supply chamber 34 for distribution into mixing chamber 20. Pressurized oxygen continues to flow into the mixing chamber 20 for distribution to the aviator until switch 130 is moved back to either detent 144 or 141.

MODE OF OPERATION OF THE INVENTION

At ground level switch 130 of the oxygen regulator 10 is placed in the first operational position, illustrated in FIG. 1. In this position, oxygen under pressure is communicated from source 20 to the entrance port 22 for distribution through the pressurized oxygen supply conduit 21. The pressurized oxygen in supply conduit 21 flows past the restrictor 166 and into conduit 62 for distribution to pressure chamber 64 to activate the on-off air inlet valve 60.

As the oxygen pressure builds up in pressure chamber 64, the resistance of spring 76 is overcome and face 72 is moved away from seat 77 to allow air to be communicated into the air inlet chamber 68 by flowing past flapper 78 in response to a pressure differential therein with the surrounding environment.

At the same time, oxygen under pressure also flows past restriction 91 in conduit 92 into the control chamber 93 of sensing member 90. With face 102 on aneroid 98 away from seat 94, this pressurized oxygen passes to the surrounding environment through passages 96.

When an operator or pilot inhales, a demand signal is communicated to the mixing chamber 20 through the flexible corregulated conduit 19. This inhalation demand signal lowers the pressure in both the mixing chamber 20 and the inhalation control chamber 26 below atmospheric pressure to create a pressure differential across the diaphragm 23. This pressure differential moves diaphragm 23 toward the inhalation control chamber 26 causing the lever arm 56 to pivot on pin 55. As lever arm 56 pivots on pin 55, arm 54 acts on projection 52 of spring guide 48 to move sleeve 46 away from the ball or cylindrical member 42 and allow pressurized oxygen in the supply conduit 21 to flow into the oxygen supply chamber 34.

The pressurized oxygen in the supply chamber 34 flows around ball 42 and the cylindrical member 38 for distribution into the mixing chamber 20. As the oxygen under pressure flows from the end of the passage 36, jet flow is created and the pressure in mixing chamber 20 adjacent end 37 of the nozzle is lowered. This lowering of the pressure in mixing chamber 20 causes air to flow from the air inlet chamber 68 into the mixing chamber 20. Thereafter, the pressurized oxygen and air in the mixing chamber 20 are combined into a breathable fluid. When the breathable fluid in the mixing chamber 20 reaches a predetermined pressure, the pressure differential across a diaphragm 23 is overcome. Thereafter, as the fluid pressure increased, diaphragm 23 moves toward the control chamber 28. As the diaphragm moves toward the control chamber 28, spring 50 acts on guide 48 to urge the sleeve 46 into engagement with the ball 42 to proportionally restrict communication of oxygen under pressure into the oxygen supply chamber 34 and move lever arm 56 with diaphragm 23. This type of operation continues for each inhalation/exhalation cycle.

As the aircraft increases in altitude, aneroid 86 in the air control chamber 82 moves face 88 toward the seat 89 to restrict the flow of air into the mixing chamber 20. At the same time aneroid 100 in sensing member 90 moves face 102 toward seat 94 to restrict the flow of oxygen under pressure to the atmosphere through control chamber 93. This restricted flow causes a pressure build up in the control chamber 93. This pressure build up in control chamber 93 is communicated through conduit 95 to control chamber 28 to aid in moving diaphragm 23 during an inhalation demand signal.

When a predetermined altitude is reached, aneroid 86 moves face 88 into engagement with seat 89 to completely interrupt the communication of air into the mixing chamber 20 from the air inlet chamber 68. At the same time, aneroid 100 on sensing member 90, continues to move face 102 toward seat 94 to further restrict the flow of pressurized oxygen to the atmosphere through passages 96 as a function of force balance of spring 99 to the oxygen pressure in control chamber 93. Thus, this oxygen pressure in control chamber 93 provides a positive pressure which acts on diaphragm 23 to compensate for changes in altitude and allows adequate oxygen flow through nozzle passage 36 to meet the existing physiological requirements of the recipient.

With a decrease in altitude, aneroid 86 in the air control chamber 82 and aneroid 100 in sensing member 90 move away from their seats 89 and 94 respectively, to re-establish the communication of air inlet chamber 68 with the mixing chamber 20 and to reduce the restriction of pressurized oxygen flow through control chamber 93 to atmospheric passages 96. Thereafter, with each inhalation demand created by the recipient the corresponding flow of pressurized oxygen into the mixing chamber 20 through nozzle passage 36 causes air to again be drawn into the mixing chamber 20 from the air inlet chamber 68 to create the breathable fluid.

Should the pressure in the mixing chamber 20 exceed a predetermined value, the face 114 of the relief valve 112 moves away from seal 116 to allow a communication with the atmosphere through exit port 113.

Should the pilot determine it is desirable to prevent the entrance of air from the surrounding atmosphere into the breathing system, selector 133 of switch 130 is moved to the right as shown in FIG. 2, and locked in a second operational position when tip 140 engages detent 144. As selector 133 moves, knob 154 engages surface 131 and stem 167 to move face 164 into engagement with seat 165 and prevent communication of pressurized oxygen from supply conduit 21 into conduit 62 through restriction 166. Thereafter, the pressurized oxygen in chamber 64 is dumped to atmosphere by way of the exit port 172 and spring 76 moves face 73 on plunger 70 moved against lip 77 to prevent the flow of air through the air inlet chamber 68. Thereafter, only pressurized oxygen flows into the mixing chamber 20 to meet the inhalation demands of the recipient.

Should the recipient feel it is necessary to be supplied with pressurized oxygen, the selector 133 of switch 130 is moved to the right as shown in FIG. 3 and locked in a third operational position when tip 140 engages groove or detent 146. As selector 133 moves, the knob 160 engages surface 31 and moves plunger 180 into engagement with diaphragm 23. When diaphragm 23 moves, lever arm 56 pivots about pin 55 causing arm 54 to act on spring guide 48 and move sleeve 46 away from ball 42 to allow unrestricted flow into the pressurized supply chamber 34. The movement of sleeve 46 and spring guide 48 is limited upon engagement of spring guide 48 with stop 61. As long as spring guide 48 is held against stop 61, pressurized oxygen flows into the pressurized oxygen supply chamber 34 for distribution to the mixing chamber 20 to provide the aviator or recipient with a continual supply of pressurized oxygen.

The oxygen regulator 200 shown in FIG. 5 differs from the oxygen regulator 10 shown in FIG. 1 principally in the construction of the balanced oxygen distribution valve 204 and therefore identical elements are identified by the same reference numeral.

The regulator 200 has a first housing 202 connected to a second housing 208 by a fastener 212. The first housing 202 has a bore 206 therein and upon attachment of the second housing 208 with the first housing 202, a mixing chamber 210 is created. The distribution valve 204 which is located in the second housing 208 has a tubular projection 214 with a nozzle end 216 which extends into the mixing chamber 210. A passage 230 connects the pressurized oxygen supply chamber 222 with the interior of tubular projection 214 to provide an unrestricted flow path for pressurized oxygen to nozzle 216. A shroud 218 surrounds the nozzle end 216 and directs the flow of pressurized oxygen into the center of the mixing chamber 210 and away from the inhalation responsive chamber 26. The shroud 218 has an opening 220 located adjacent air passage 87 going to the air control chamber 82. Flow of pressurized oxygen through the nozzle 216 causes the pressure in the mixing chamber 210 in the area of opening 220 to be lower than the pressure of the air in the surrounding environment, thus air flows from the air inlet chamber 68 into the mixing chamber 210.

The flow of oxygen from the supply conduit 21 into the pressurized oxygen supply chamber 222 through opening 224 is controlled through the movement of poppet 226 by the linkage connection 228 of diaphragm 23.

The connection linkage 228 in addition to lever 56 and arm 54 which are mounted on pivot 55 also includes a piston 232. Piston 232 has a first diameter section 234, which fills bore 236 to prevent communication between the pressurized oxygen chamber 222 and the inhalation responsive chamber 26, and a second diameter section 238 which passes through opening 224 and engages poppet 226.

A flexible wire cable 240 connects the poppet 226 with a sleeve 242 located in bore 243. Bore 243 is connected to conduit 92 going to sensing member 90. The sleeve 242 has a diameter which is substantially equal to the diameter (which is substantially equal to the diameter) of opening 224 thereby balancing the effect of the pressurizing oxygen acting on the poppet 226. Sleeve 242 has a series of axial slots 245 on its peripheral surface to provide a control flow path or leak for communicating pressurized oxygen from conduit 21 to sensing member 90.

A spring 246 urges the poppet 226 into seat 248 to prevent communication of pressurized oxygen into the pressurized oxygen chamber 222 when the fluid pressure in the inhalation responsive chamber 26 is greater than the pressure in control chamber 28.

In order to provide better transmission of inhalation signals to the inhalation responsive chamber 26, a static pressure tube 250 extends from opening 254 in partition 252 to a position adjacent the outlet port 16.

The operation of the oxygen regulator 200 is exactly the same as oxygen regulator 10 shown in FIG. 1. However, to show the relationship of valve 204 and related components, the regulator operation when switch 133 is in the first position as shown in FIG. 4 is as follows:

An inhalation demand by a recipient lowers the pressure of the breathable fluid in the mixing chamber 210. Lowering the pressure of the breathable fluid in chamber 210 also lowers the pressure in the inhalation responsive chamber 26 to create a pressure differential across diaphragm 23. This pressure differential causes the diaphragm 23 to move toward the inhalation responsive chamber 26. This diaphragm movement is transmitted to piston 230 as lever 56 and arm 54 pivot on pin 55. Movement of piston 230 overcomes spring 248 and allows pressurized oxygen to enter into the pressurized oxygen supply chamber 222 and flow into tube 214.

Figure 4:
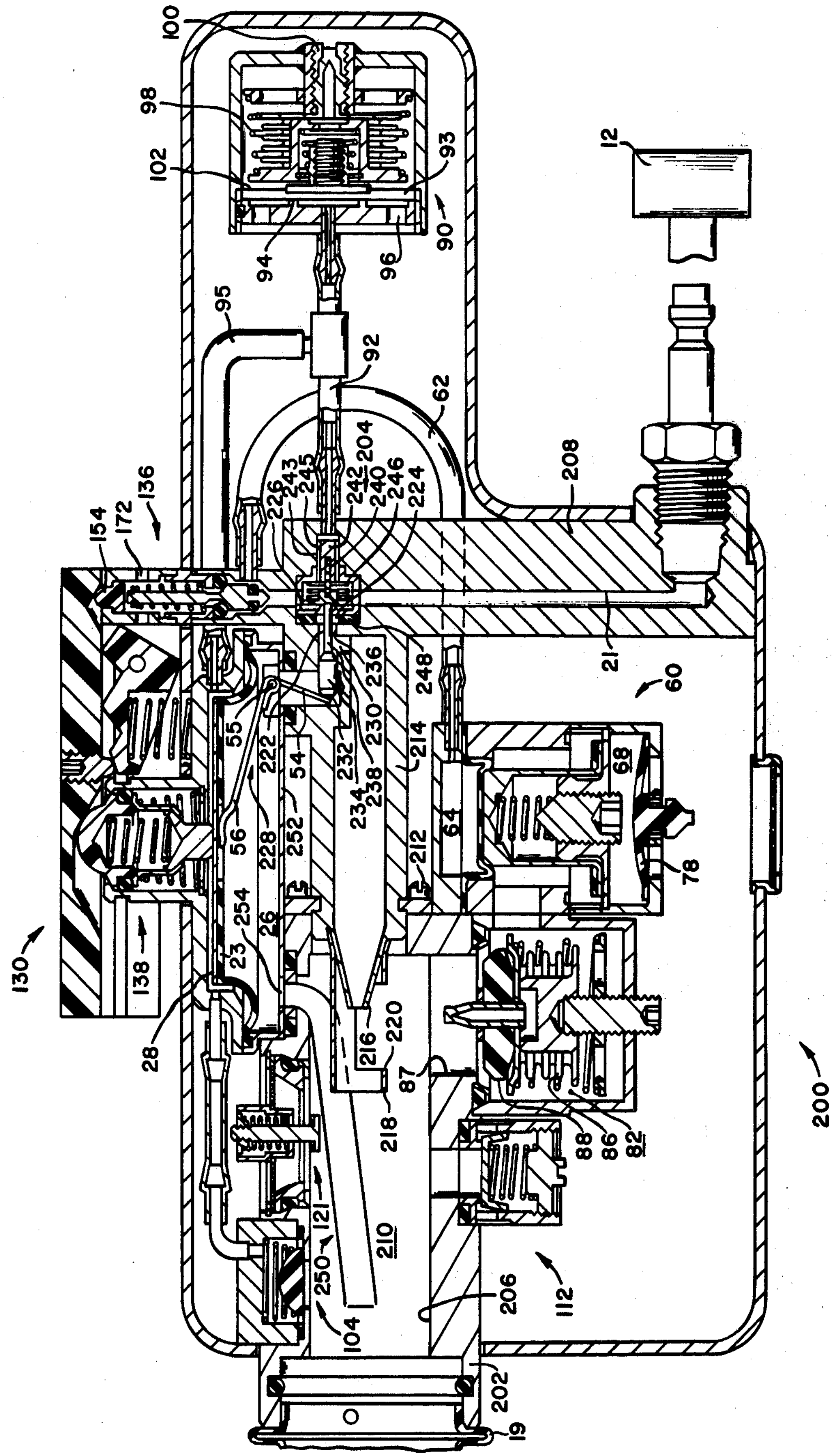
FIG. 4 is a sectional view of a secondary embodiment of an oxygen inlet valve for use in the oxygen regulator of FIG. 1.

The converging nozzle 216 shown in FIG. 4, causes the velocity or pressurized oxygen to increase as it passes from tube 214 into the mixing chamber 210. This high velocity pressurized oxygen is directed by shroud 218 into the mixing chamber 210.

This high velocity flow of pressurized oxygen causes the pressure in the mixing chamber 210 adjacent opening 220 to be lowered. This lowering of the pressure in the mixing chamber creates a vacuum, adjacent opening 87 which creates a pressure differential across flapper 78. This pressure differential causes air to flow from the air inlet chamber 68 into the mixing chamber 210 where the air is combined with the pressurized oxygen flowing from nozzle 216 to create a breathable fluid therein.

The flow of pressurized oxygen and air into the mixing chamber 210 causes the fluid pressure of the breathable fluid to rise. This rise in fluid pressure is transmitted to the inhalation responsive chamber 26 through static pressure tube 250. When the fluid pressure of the breathable fluid reaches a predetermined value sufficient to overcome the force of the fluid pressure in the control chamber 28, diaphragm 23 moves toward the control chamber 28.

At the same time, return spring 246 acts on poppet 226, to move poppet 226 toward seat 248, and on piston 234, to move arm 54 and lever 56 into engagement with the diaphragm 23. When poppet 226 engages seat 248, the flow of pressurized oxygen from conduit 21 terminates until the next inhalation demand causes diaphragm 23 to again move toward chamber 26.

The above cycle of operation for regulator 200 is repeated during each inhalation/exhalation cycle of the recipient in this first mode of operation and in the second and third modes of operation in a manner similar to that described with respect to regulator 10.

I claim:

1. A balanced valve comprising:

a housing having a supply chamber connected to a mixing chamber by a passage, said supply chamber having an inlet port, said mixing chamber having an outlet port;

a tube connected to said inlet port for communicating fluid into said supply chamber;

seat means located in said passage;

sleeve means surrounding said tube;

resilient means for biasing said sleeve means into engagement with said seat means to contain the fluid in said tube; and actuator means responsive to an operational signal for moving said sleeve means to allow fluid to flow around said seat means and through said passage into a mixing chamber.

2. The balanced valve, as recited in claim 1, wherein said seat means includes:

a spherical member for providing a sealing surface for said sleeve means.

3. The balanced valve, as recited in claim 2, wherein said seat means further includes:

a cylindrical member located on said passage for establishing a fixed area orifice with said housing through which said fluid is communicated into said mixing chamber.

4. The balanced valve, as recited in claim 3, wherein said seat means further includes:

fastener means for connecting said spherical member and cylindrical member to said housing to fix the position of said spherical member with respect to said tube.

* * * * *